(12) United States Patent
Scharf et al.

(10) Patent No.: US 9,179,598 B2
(45) Date of Patent: Nov. 10, 2015

(54) TWINE RETAINING DEVICE FOR A BALER

(71) Applicant: USINES CLAAS FRANCE S.A.S., Woippy (FR)

(72) Inventors: Thorsten Scharf, Mettlach (DE); Daniel Moersch, Perl (DE); Ulrich Hesselmann, Saarburg (DE)

(73) Assignee: USINES CLAAS FRANCE S.A.S., Woippy (FR)

( * ) Notice: Subject to any disclaimer, the term of this patent is extended or adjusted under 35 U.S.C. 154(b) by 0 days.

(21) Appl. No.: 14/493,438

(22) Filed: Sep. 23, 2014

(65) Prior Publication Data

US 2015/0083001 A1  Mar. 26, 2015

(30) Foreign Application Priority Data

Sep. 23, 2013 (DE) .......................... 10 2013 015 641

(51) Int. Cl.
*A01F 15/14* (2006.01)
*A01D 39/00* (2006.01)

(52) U.S. Cl.
CPC .............. *A01D 39/00* (2013.01); *A01F 15/145* (2013.01)

(58) Field of Classification Search
CPC ....... A01D 39/00; A01D 59/00; A01D 59/04; A01F 15/145
USPC .......................... 100/8, 33 R, 34; 289/13, 14
See application file for complete search history.

(56) References Cited

U.S. PATENT DOCUMENTS

| 1,529,914 | A | * | 3/1925 | Prochazka | 289/13 |
| 3,215,460 | A | * | 11/1965 | Lynn et al. | 289/14 |
| 3,321,224 | A | * | 5/1967 | Lynn | 289/14 |
| 3,370,875 | A | * | 2/1968 | Grillot | 289/14 |
| 2012/0211979 | A1 | * | 8/2012 | Schumacher et al. | 289/2 |

FOREIGN PATENT DOCUMENTS

DE  1923729  9/1965

* cited by examiner

*Primary Examiner* — Jimmy T Nguyen
(74) *Attorney, Agent, or Firm* — Michael J. Striker

(57) ABSTRACT

A twine retaining device for a baler includes a retaining disk, which can rotate about a shaft, and a retaining plate, which jointly delimit a retaining gap. The retaining gap is defined by a plurality of constrictions distributed along a twine strand extending through the retaining gap.

6 Claims, 1 Drawing Sheet

TWINE RETAINING DEVICE FOR A BALER

CROSS-REFERENCE TO A RELATED APPLICATION

The invention described and claimed hereinbelow is also described in German Patent Application DE 10 2013 015641.6, filed on Sep. 23, 2013. The German Patent Application, the subject matters of which is incorporated herein by reference, provides the basis for a claim of priority of invention under 35 U.S.C. 119(a)-(d).

BACKGROUND OF THE INVENTION

The present invention relates to a twine retaining device for use in a baler. A twine retaining device of this type is known from DE 1 923 729 U1.

Block balers conventionally comprise a bale chamber, in which a baling ram is moved back and forth to press crop that has been fed into the baling chamber transversely to the direction of motion of said baling ram against a bale that is already present in order to compress the crop. As soon as the thusly produced crop bale has reached the intended size, said crop bale is knotted. Strands of twine required therefor are wrapped around the bale while said bale is being produced and are exposed to the pressure of the ram with each stroke thereof. A twine retaining device must apply a considerable amount of retaining force onto the free end of such a twine strand during the formation of the bale in order to ensure that the twine does not slip out of the clamping device under the effect of the strokes of the ram.

In the case of a conventional twine retaining device, however, when the clamping force to which the twine is exposed between the retaining disk and the retaining plate is selected too high, there is a risk that the twine will incur internal damage due to the clamping and will ultimately tear under the pressure of the ram. The consequences for the operation of the baler are similar if twine that is clamped too loosely slips out of the clamping device, or if twine that is clamped too tightly tears. The bale can no longer be completed, the material of the unfinished bale must be removed from the bale chamber, and the twine must be re-threaded into the clamping device and secured therein. The work interruptions associated therewith have a considerable negative impact on the cost effectiveness of a harvesting operation.

SUMMARY OF THE INVENTION

The present invention overcomes the shortcomings of known arts, such as those mentioned above.

To that end, the present invention provides a twine retaining device wherein the risk of clamping being too loose or too tight is reduced.

In an embodiment, the invention provides a twine retaining device for a baler comprising a retaining disk, which can rotate about a shaft, and a retaining plate, which jointly delimit a retaining gap. The retaining gap has a plurality of constrictions, which are distributed along a twine strand extending through the retaining gap and which are separated from each other by recesses. At the constrictions, the twine is exposed to relative strong pressure and therefore the cross-section thereof deforms to a greater extent than in the recesses between the constrictions.

In order for the twine to slip due to the effect of a tension force applied by the baling ram, it is not only necessary to overcome the friction between the twine and the surfaces of the twine retaining device clamping said twine, but it is also simultaneously necessary for the twine cross-section to deform during passage through the constriction.

In order to achieve a given tensile loadability of the clamps, less friction drag is therefore required than is the case when the twine is clamped in a retaining gap having a gap width that is constant or enlarges toward the knot. This makes it possible to reduce the clamping force (and, therefore, the risk of the twine becoming damaged by the clamping), without the tensile loadability of the clamping simultaneously decreasing.

The recesses are preferably distributed on the retaining plate and the retaining disk, although they also may be provided only on the retaining plate or on the retaining disk without deviating from the scope and spirit of the invention.

The clamping points are preferably formed by projections and recesses of the retaining plate and the retaining disk, wherein a recess of the retaining disk is disposed opposite a projection of the retaining disk in each case, and/or a recess of the retaining plate is disposed opposite a projection of the retaining disk in each case. In this manner, the cross-section of the twine is not only deformed at the constrictions, but also is curved around a narrow radius, thereby ensuring that flexing work must be performed, in addition, in order to pull the twine out Of the clamping. This also contributes to the resistance of the twine to being pulled out of the retaining gap.

The projections preferably have flat apex surfaces. In order to ensure that the projections of the retaining disk and the retaining plate offset relative to one another do not have a cutting effect on the twine, the extension of the apex surfaces should be at least as great as the recesses opposite thereto. It is thereby possible to prevent the apex surfaces from entering the recess, by which a cutting effect could be exerted onto the twine.

The projections and recesses are preferably linear.

In order to ensure that the twine clamped in the retaining gap cannot escape a tensile loading by the baling ram by moving transversely to the direction of force, the linear projections and recesses are preferably oriented perpendicularly to a strand of the twine that is exposed to the tensile force and is retained in the clamping device.

The retaining disk can have two identical arrangements of projections and recesses, which can be positioned alternately relative to the projections and recesses of the retaining plate and preferably alternate from one bale to the next as the twine is clamped.

BRIEF DESCRIPTION OF THE DRAWINGS

Further features and advantages of the invention will become apparent from the description of exemplary embodiments that follows, with reference to the attached figures. Therein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
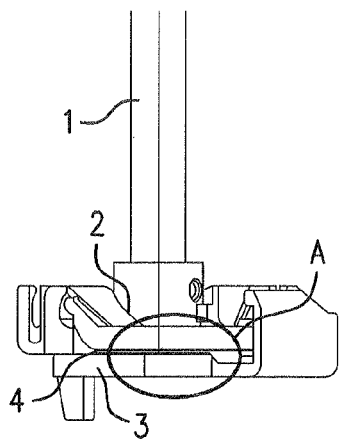
FIG. 1 shows a side view of the twine retaining device.

FIG. 1 shows a side view of a twine retaining device according to the invention, without a twine strand clamped therein. A twine retaining disk 2 is mounted on the tip of a periodically rotationally drive shaft 1 in a manner known per se. A retaining plate 3 is acted upon by a spring (not shown in the figure), against a retaining surface of the twine retaining disk 2 facing away from the shaft 1. Since there is no twine clamped between the twine retaining disk 2 and the retaining plate 3 in the configuration shown, a retaining gap 4 between the two is closed, and the twine retaining disk 2 and the retaining plate 3 touch one another at points.

Figure 2:
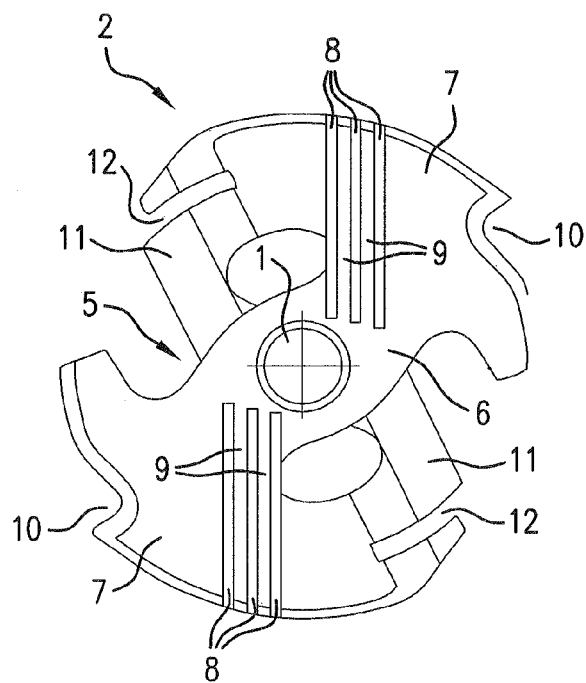
FIG. 2 shows a top view of the retaining surface of a retaining disk of the twine retaining device.

FIG. 2 shows a top view of the side of the twine retaining disk 2 facing the retaining plate 3. A relatively flat retaining surface 5 of the twine retaining disk 2 is dumbbell-shaped as viewed from above, and comprises a center piece 6, on which the shaft 1 is non-rotatably anchored, and two end pieces 7, which are wider than the center piece 6. An arrangement of a plurality of parallel, wave-shaped recesses 8 is formed in each of these end pieces 7. Projections 9 between the recesses 8 lie in a plane with the surrounding retaining surface 5. The end pieces 7 each comprise an edge notch 10, which is offset in the clockwise direction relative to the recesses 8, and a flank 11, which is offset in the counterclockwise direction and rises at a slant from the plane of the retaining surface 5, in which said flank a slot 12 is formed. Every time that the collection and compression of material for a bale is completed, a twine needle (which is known per se and is not shown in FIG. 2, therefore) guides a twine strand forward to one of the end pieces 7. The twine strand is wrapped over the retaining surface 5, between the edge notch 10 and the flank 11, and thereby crosses the recesses 8. When the twine retaining disk 2 subsequently rotates by 180°, the slot 12 is moved past a stationary knife, whereby the knife severs the twine strand. Of the two ends of twine obtained as a result, one hangs on the bale, the knotting of which has since been completed, and leaves the knotter. The other end of the twine remains clamped in the clamping device.

During the subsequent phase of compressing material for the next bales, a free end of the twine strand is therefore located at approximately the height of one of the two flanks 11 of the retaining disk 2, and the twine strand extends past one of the groups of recesses 8 substantially at a right angle to the edge notch 10. The twine strand redirected at the edge notch 10 extends further in the direction of the bale chamber, where said twine strand is exposed to the tension force of the ram, which is compressing the crop.

Figure 3:
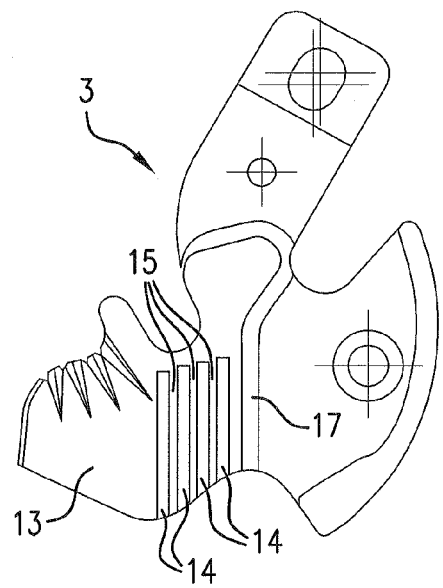
FIG. 3 shows a top view of the retaining surface of a retaining plate of the twine retaining device.

The twine retaining disk 2 is disposed opposite the retaining plate 3, which is shown in a top view in FIG. 3. The retaining plate also has a substantially flat retaining surface 13, in which a group of straight recesses 14 is formed. The recesses 14 outnumber the recesses 8 of the retaining disk 2 by one. In the assembled state in FIG. 1, these recesses 14 and projections 15, which extend between said recesses and are flush with the retaining surface 13, interact with one of the groups of recesses 8 and projections 9 of the twine retaining disk 2, in order to clamp the twine strand at the severed end thereof.

Figure 4:
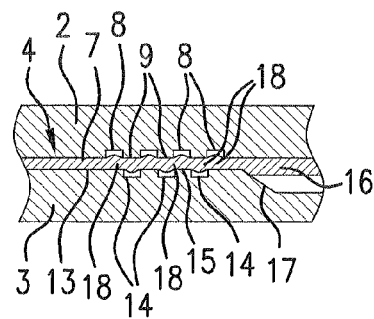
FIG. 4 shows a cross-section of an encircled section "A" of the twine retaining device of FIG. 1, to highlight the retaining plate and retaining disk along a strand of twine clamped therebetween.

FIG. 4 shows a cross-section of an encircled section "A" of the twine retaining device of FIG. 1, including the twine retaining disk 2 and retaining plate 3 along the clamped strand of twine, which is labeled with numeral 16 here. The retaining surface 13 of the retaining plate 3 only occupies the left part of FIG. 4. The retaining surface terminates at a slanted shoulder 17, on the other side of which the distance between the twine retaining disk 2 and the retaining plate 3 is too great to clamp and deform the twine strand 16. The twine strand 16 is therefore pressed flat only on the left side of the shoulder 17. To the right thereof, the twine strand is shown with the natural diameter thereof, of approximately 5 mm.

On the left side of the shoulder 17, a projection 9 of the twine retaining disk 2 is disposed opposite a recess 14 of the retaining plate 3 in each case, and a projection 15 of the retaining plate 3 is disposed opposite a recess 8 of the twine retaining disk 2 in each case. The projections 9, 15 each have flat end faces, which face the recesses 8, 14 and which, in this case, are each slightly wider than the recesses 8, 14 disposed opposite thereto. It is thereby ensured that the cross-section of the twine strand 16 is indeed deformed at the constrictions 18 at which edges of the projections 9 and 15 are disposed opposite one another. The cross-section, however, is not substantially exposed to shear stress, which could cause damage and ultimately tear the strand 16 due to the effect of the tension force applied by the baling ram.

Between two constrictions 18, a recess 8 or 14 in each case provides the twine strand 16 with space in which to escape, and so the cross-section of said twine strand is flattened to a lesser extent there than in the constrictions 18. The twine strand 16 can therefore succumb to the tension of the baling ram and slide in the retaining gap 4 only if the friction drag as well as the resistance of the twine strand 16 to deformation of the cross-section thereof is overcome at each constriction 18. Since the projections 9, 15 are slightly wider than the recesses 14, 18 disposed opposite thereto, said projections cannot engage in the recesses and, therefore, cannot exert a strain on the twine strand 16, which would be added to the tensile loading applied by the ram and thereby promote the tearing of the strand 16. A fixed seat of the twine strand is thereby achieved with relatively low material stressing, thereby reducing the risk of tearing and the risk of escaping from the retaining gap 5.

REFERENCE CHARACTERS 1 shaft
2 twine retaining disk
3 retaining plate
4 retaining gap
5 retaining surface
6 center piece
7 end pieces
8 recess
9 projection
10 edge notch
11 flank
12 slot
13 retaining surface
14 recess
15 projection
16 twine strand
17 shoulder
18 constriction As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A twine retaining device for a baler, comprising:
a retaining disk that is rotatable about a shaft;
a retaining plate;
a plurality of recesses and projections are distributed on the retaining disk; and
a plurality of recesses and projections are distributed on the retaining plate,
wherein the projections of the retaining plate are disposed directly opposite to the recesses of the retaining disk and the projections of the retaining disk are disposed directly opposite to the recesses of the retaining plate so that the retaining disk and retaining plate jointly delimit a retaining gap characterized by a plurality of constrictions that are separated from each other by the recesses on the retaining disk and the retaining plate; and wherein a twine strand extending through the retaining gap is subjected to a constricting pressure at the constrictions that is relatively higher that a constricting pressure at the recesses.

2. The twine retaining device according to claim 1, wherein the projections have flat apex surfaces.

3. The twine retaining device according to claim 2, wherein an extension of the apex surfaces is at least as great, in each case, as that of the recesses disposed opposite thereto.

4. The twine retaining device according to claim 1, wherein the projections and recesses are linear.

5. The twine retaining device according to claim 4, wherein the projections and recesses are oriented perpendicular to a strand of the twine held in the retaining device.

6. The twine retaining device according to claim 1, wherein the retaining disk comprises two identical arrangements of projections and recesses, which can be positioned alternately relative to the projections and recesses of the retaining plate.

* * * * *